(12) United States Patent
Brillhart et al.

(10) Patent No.: US 8,171,325 B2
(45) Date of Patent: May 1, 2012

(54) COMPUTING COMPONENT AND ENVIRONMENT MOBILITY

(75) Inventors: David C. Brillhart, Orlando, FL (US); Christopher J. Dawson, Arlington, VA (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 12/327,193

(22) Filed: Dec. 3, 2008

(65) Prior Publication Data

US 2010/0138530 A1    Jun. 3, 2010

(51) Int. Cl.
*G06F 1/00* (2006.01)
*G06F 1/32* (2006.01)

(52) U.S. Cl. ........ 713/324; 713/300; 713/310; 713/320; 713/321; 713/322; 713/323; 709/223; 718/102; 718/104

(58) Field of Classification Search .................. 713/300, 713/310, 320–324, 340; 709/223; 718/102; 718/104
See application file for complete search history.

(56) References Cited

U.S. PATENT DOCUMENTS

| | | | |
|---|---|---|---|
| 2005/0101335 A1 | 5/2005 | Kelly et al. | |
| 2006/0047808 A1 | 3/2006 | Sharma et al. | |
| 2006/0259622 A1 | 11/2006 | Moore et al. | |
| 2007/0089446 A1 | 4/2007 | Larson et al. | |
| 2007/0180117 A1 | 8/2007 | Matsumoto et al. | |
| 2007/0260417 A1* | 11/2007 | Starmer et al. | 702/136 |
| 2008/0008095 A1* | 1/2008 | Gilfix | 370/235 |
| 2008/0066073 A1 | 3/2008 | Sen | |
| 2009/0254909 A1* | 10/2009 | Hanson et al. | 718/102 |
| 2011/0055604 A1* | 3/2011 | Jackson | 713/320 |

* cited by examiner

*Primary Examiner* — M Elamin
(74) *Attorney, Agent, or Firm* — Patrick J. Daugherty; Driggs, Hogg, Daugherty & Del Zoppo Co., LPA (57) ABSTRACT

Methods, services, devices, and programmable code are provided for moving computing processes without loss of service. Powered components supporting a computing infrastructure executing computing processes are monitored for thermal characteristics, each associated with at least one of the deployed components. A thermal characteristic rule set comprising a threshold is applied to the monitored characteristics, and in response to an association with a monitored characteristic correlating with the threshold, a computing process is moved from one powered component to another having a monitored thermal characteristics not correlated with the threshold, the moving in real-time and without causing an interruption of service to an end user using the moved process.

20 Claims, 4 Drawing Sheets

COMPUTING COMPONENT AND ENVIRONMENT MOBILITY

FIELD OF THE INVENTION

The present invention generally describes methods, systems and devices for allocating computing system tasks as a function of operating condition observations, and more particularly including balancing physical data system thermal characteristics by means of computer application and partition mobility.

BACKGROUND OF THE INVENTION

Computer systems may include a plurality of separate computers, processing components and peripheral devices. It is common for such multiple device systems to span physical areas large enough to encompass multiple and divergent environmental operating conditions, and some conditions may negatively impact device performance. For example, data center facilities housing multiple operating devices within one or more enclosed or otherwise defined areas, sometimes referred to as "computer rooms," must accommodate and dissipate heat generated by the operation of the computing devices, as well as generally cool or heat the room in response to outside temperature changes and conditions. Although a room may be designed with a heating, ventilation and cooling (HVAC) system sufficient to generally handle a plurality of computing devices, actual implementations of the devices may cause discrete hot spots and cold spots to develop within the room. Devices within or near a hot spot may be subject to unacceptably high temperatures that may negatively impact performance, in some examples causing devices to become damaged or unserviceable until temperatures are reduced. In contrast, devices near or within a cold spot may experience cooling environmental conditions more than adequate to remove any heat generated through their operations, as well as additional heat generated by other devices or by increasing operational loads on said cold spot devices.

Managing computer room and overall data center temperature and thermal distribution to prevent or abate hot spots may be difficult. Often a room or center design is static and unable to adapt to changing equipment performances. For example, an HVAC system designed for a computer room for a given set of computer system device operating parameters may be rendered ineffective or obsolete as equipment or computing tasks change over time, resulting in an operating environment not properly balanced for subsequent computer room equipment or operations. Moreover, operating conditions in a room or center may change as workload demands fluctuate across devices and applications, causing some workloads to become more energy intensive, for example through demand shifts from peak to non-peak time periods or over an operating day or even as considered over other longer durations such as seasonal or general business growth time periods.

Redistributing HVAC and other cooling resources such as chillers and blowers within a data room or center in order to meet changing heating and cooling demands may be difficult, time consuming, expensive, impractical or even unfeasible. Modifications of cooling systems may require all or part of a data room or center to lose power or heating or cooling attributes during implementation, which may exacerbate heating and cooling problems. Moving computing applications from device within hot spots to others within cool areas is also generally impractical as typically involving an inconvenient or unacceptable interruption or loss of computing services.

SUMMARY OF THE INVENTION

The present invention teaches methods for moving computing processes without loss of service. Powered components supporting a computing infrastructure executing computing processes are monitored for thermal characteristics, each associated with at least one of the deployed components. A thermal characteristic rule set comprising a threshold is applied to the monitored characteristics, and in response to an association with a monitored characteristic correlating with the threshold, a computing process is moved from one powered component to another having a monitored thermal characteristics not correlated with the threshold, the moving in real-time and without causing an interruption of service to an end user using the moved process.

In another aspect, service methods are provided comprising deploying applications for moving computing processes without loss of service according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for moving computing processes without loss of service. Moreover, systems, articles and programmable devices configured for performing one or more method and/or process elements of the current invention are also provided for moving computing processes without loss of service, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
I. General Description; and
II. Computerized Implementation.

I. General Description

Figure 1:
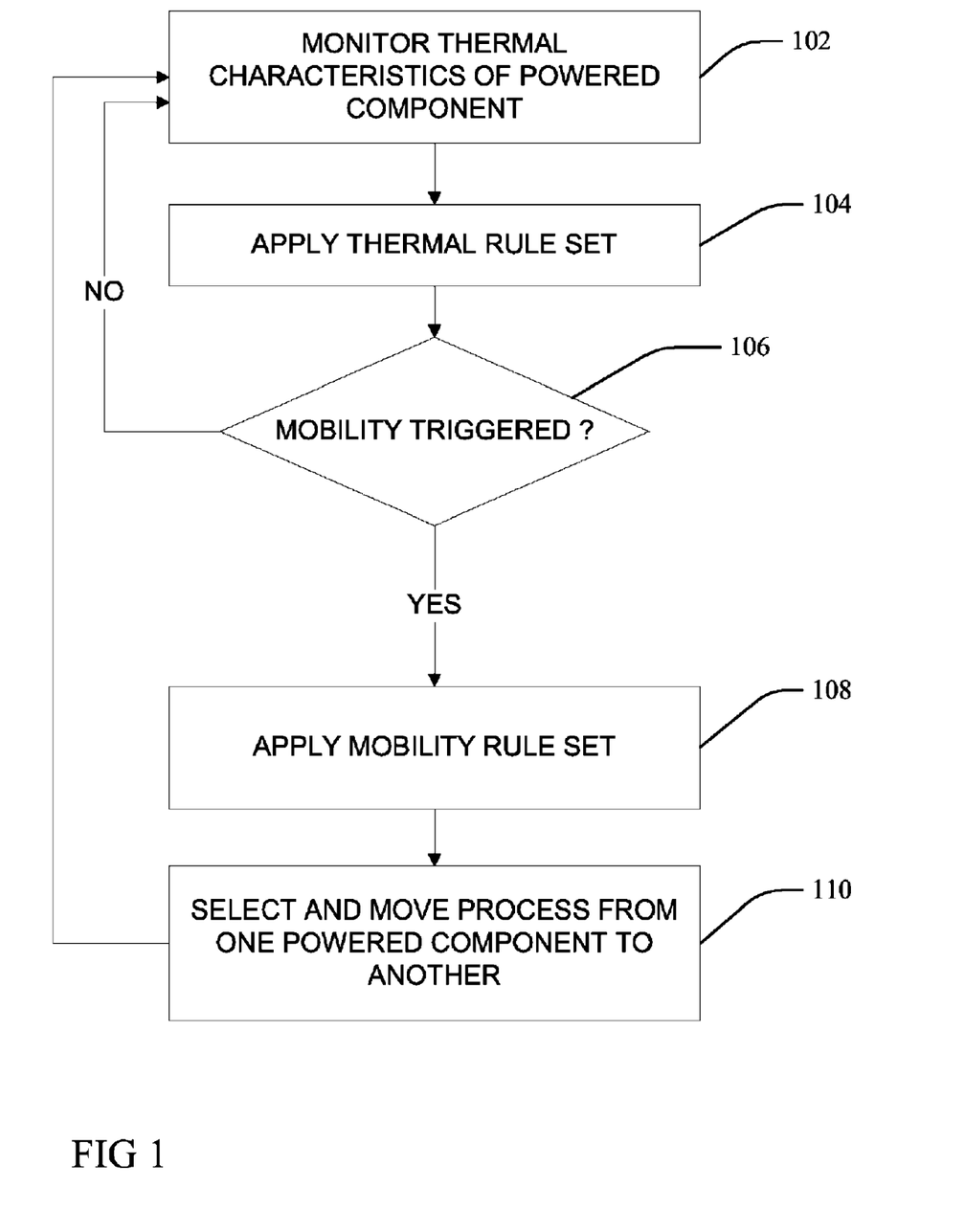
FIG. 1 is a flow chart illustrating a method and system for moving computing processes without loss of service according to the present application.

The present application discloses systems, methods, devices and program products for moving computing processes without loss of service. Embodiments assist in balancing the thermal characteristics of a computing infrastructure (for example, a data center) by moving processes away from hot spots or other high-temperature areas or devices and into another zone/powered component/area/etc. where a temperature is at or below a normal or otherwise desired temperature. Referring now to FIG. 1, at 102 a plurality of powered components is monitored for temperature readings or other thermal attributes or characteristics, for example by monitoring one or more of the plurality of powered components or physical locations associated with the powered components deployments. Illustrative examples of the powered components include hard drives, processing devices such as a computer, a personal digital assistant or a server, and still other powered components appropriate for use with the present application will be apparent to one skilled in the art.

At 104 a thermal characteristic rule set is applied to the monitoring observations, the set comprising at least one thermal characteristic threshold or other trigger for determining whether movement of a process between powered components is indicated. At 106 the monitored observations are analyzed or otherwise compared to the threshold to determine whether an observation correlates with the threshold; illustrative examples of a threshold correlation include meeting a trigger criterion by violating, meeting or exceeding a threshold value, and still other correlation examples useful in determining whether a process movement is indicated will be apparent to one skilled in the art. If no threshold correlation is determined at 106, monitoring continues at 102.

If, however, a threshold correlation or other trigger event is determined at 106, then at 108 a mobility rule set is applied in response and at 110 one or more processes running powered components associated with the correlation are selected and moved to another of the powered components in compliance with the threshold trigger. In particular, moving a process at 110 is preformed in real-time with respect to the process, without causing an interruption of service to an end user using the moved application; thus, the user may continue to use the process and remain unaware of and otherwise not inconvenienced by movement of the process.

Figure 2:
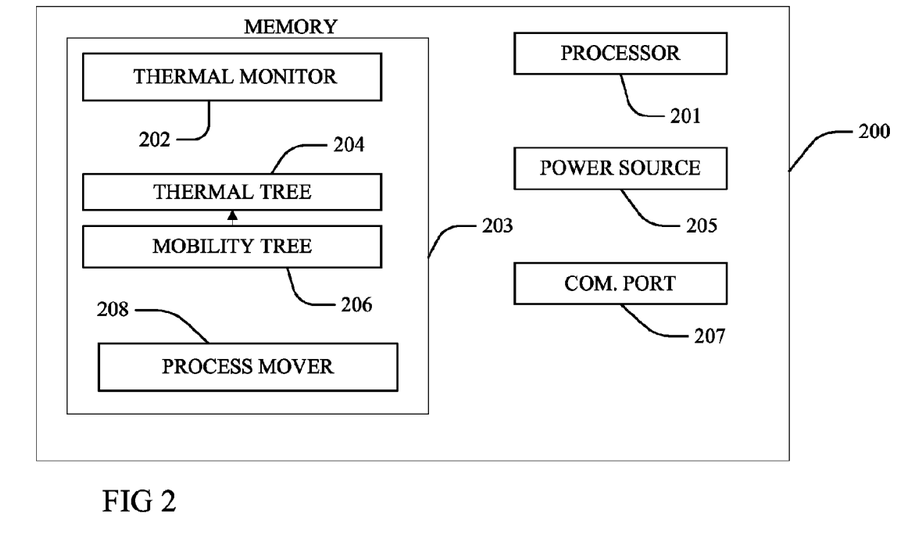
FIG. 2 is a block diagram of a system or device configured to move a computing process from one powered component to another without a loss of service according to the present application.

FIG. 2 illustrates a programmable device or module 200 configured to move a process, computing application, etc., from one powered component to another without a loss of service according to the present application. The device 200 may be incorporated into a large system wherein other components of the system accomplish systems and methods according to the present invention, or it may be a stand-alone device or module configured to perform each of the systems and methods. The present embodiment comprises a central processing unit (CPU) or other processing means 201 in communication with a memory 203, the memory 203 comprising logic components that enable the CPU 201 to perform processes and methods according to the present application. The memory 203 comprises a monitor logic component 202; a thermal rule set logic tree or other form of logic component 204, including at least one thermal trigger, which when implemented configures the device 200 to determine compliance of thermal observations with the rule set; a mobility rule set logic tree or other logic component 206, which when implemented configures the device 200 to determine whether a process movement is indicated, as well as to select and identify a process for movement; and a process mover logic component 208, which when implemented configures the device 200 to effect movement of a process from one powered component to another. A power unit 205 is configured to provide operative power to the device 200; examples include battery units 205 and power inputs configured to receive alternating or direct current electrical power, and other appropriate power units 205 will be apparent to one skilled in the art. A communication port or network link/node means 207 is also provided and configured to enable network and other communications with other devices, systems, monitoring, administrative and service provider entities, as well as others as appropriate.

Figure 3A:
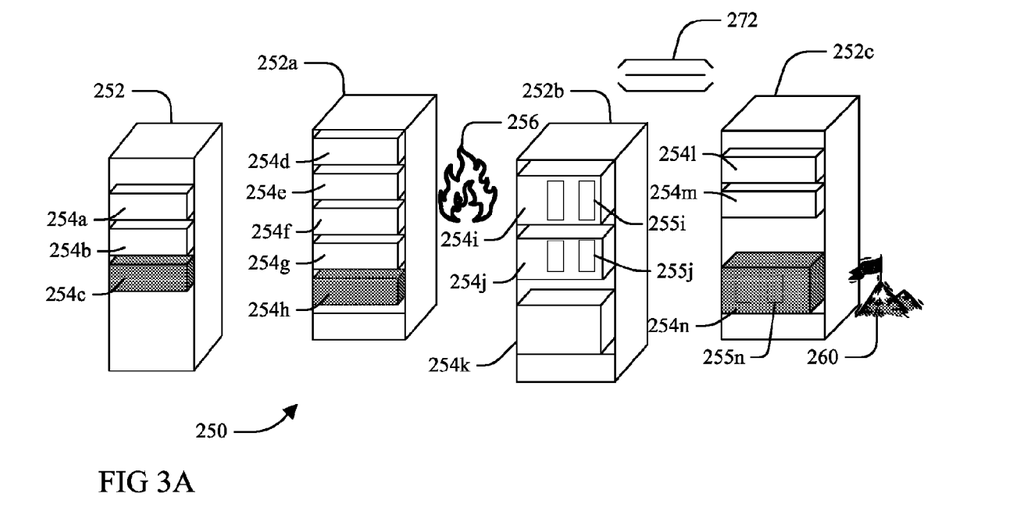
FIGS. 3A and 3B are block diagrams of an implementation of a system or device configured to monitor temperatures and provide process mobility according to the present application.
Figure 3B:
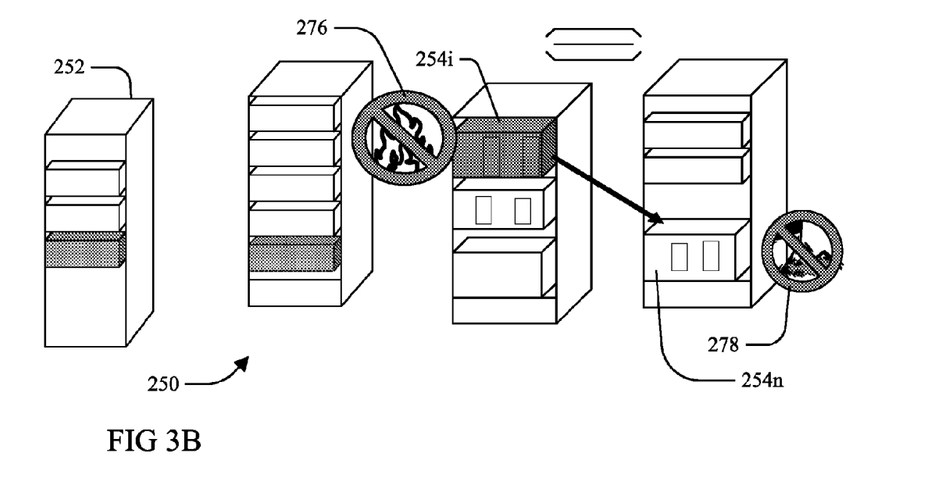

FIGS. 3A and 3B illustrate an application of one embodiment of the present invention in a computer room or data center 250 comprising a plurality of server racks 252, each rack 252 comprising a plurality of servers 254, the servers 254 each further comprising at least one powered component 255. Examples of powered, heat-generating or heat sensitive computer components 255 include memories such as a hard disks or drives, and processors and co-processors, and still other components 255 will be apparent to one skilled in the art. FIG. 3A shows the development of a hot spot 256 between server racks 252a and 252b near servers 254e and 254i, and a cold spot 260 at the base of rack 252c near server 254n. Hot spots 256 and cold spots 260 may develop relatively quickly or over longer time frames, and may occur in rooms 250 that are well designed. They may occur throughout a business day, as well as over other longer or shorter operating time periods, as workload demand fluctuates across applications, or as seasonal or general business growth causes some workloads to become more intense with respect to certain racks 252 or servers 254.

In the example illustrated in FIGS. 3A and 3B, as may be typically found in many data center environments, there are numerous and varied computing server 254 resources with varying heat signatures. In many multi-server high performance computing (HPC) or grid environments, there may be idle servers, such as servers 254c, 254h and 254n, which are in the present example not currently in use or not powered on, or which are otherwise operating below a temperature of concern, resulting in cold spot 260 detected in or within the proximity of server 254n, this location also distal-most to any other operating server 254 and thus subject to the least amount of radiate heat from any of the other operating servers 254. In contract, hot spot 256 is caused or enabled by radiate or exhausted heat contributed by adjacent operating servers 254e and 254i, and also by other proximate operating servers 254d, 254f and 254j.

Other powered components may also be monitored. In the present example, the heat signatures or other characteristics of the individual powered components 255 associated with the servers 254 may be considered. Thus, the hot spot 256 may be associated with and considered caused or enabled by radiate or exhausted heat contributed by adjacent operating server hard drives 255i and proximate operating server drives 255j, wherein server hard drive 255n is not currently in use, powered on or otherwise operating below a temperature of concern, resulting or enabling the cold spot 260 detected in or within the proximity of server 254n.

Embodiments of the present application are configured to monitor temperature and other thermal characteristics within the room 250 and responsively move presently operating processes from one server 254 to another, or from one server component 255 to another, in real-time, without causing an interruption of service to an end user with respect to using the moved applications. In some embodiments, applications may be moved in real-time through use of application mobility methods and systems, for example through implementation of a Live Application Mobility feature of the AIX® Version 6.1 operating system (AIX is a registered trademark of IBM Corporation in the United States, other countries, or both), whereby a running application can be moved from one physical server to another physical server with no application downtime, and thus transparently with respect to an end-user.

Moreover, some embodiments are configured to function with and utilize Logical Partition (LPAR) structures, wherein a logical partition is a logical server that is hosted and presented on a physical server. Multiple LPARs may exist on a given physical server, each of which appearing to applications and end users to be an individual physical server, and thus according to the present applications partitions may also be moved from one physical server 254 to another, different physical server 254 with no application downtime, for example through use of "Live Partition Mobility" methods and systems featured by POWER 6™ architecture (POWER 6 is a trademark of IBM Corporation in the United States, other countries, or both), whereby a running application environment including an operating system and a plurality of running applications can be moved from one physical server to another in real-time with no application downtime. In contrast, use of other prior art application mobility methods and systems to relocate operating workloads between servers generally causes an undesirable or unacceptable interruption of service to an end user.

Mobility of applications, environments, partitions and other resources according to the present application may be based on one or more thresholds or other triggers enabled by user-defined rules within thermal rule application and/or mobility rule sets. In one embodiment a first thermal rule set establishes temperatures or temperature variant thresholds that trigger the invocation of mobility features of the present application. Illustrative examples of temperature rules suitable for application to temperature observations within the computer room 250 include the temperature at a location has exceeded a target temperature; the temperature at a location has dropped below a target temperature; the temperature at a location has decreased by a specified percentage value; the temperature at a location has increased by a specified percentage value; the temperature difference between two or more locations has decreased by a specified percentage value; and, the temperature difference between two or more locations has increased by a specified percentage value. Thus, the need of movement from a first powered component experiencing a hot spot condition, and the appropriateness of a second powered component to receive a moved application or environment, may be established by applying the rules to thermal readings associated with each respective powered component. Moreover, other rules appropriate for practicing with the present invention will also be apparent to one skilled in the art.

If application of a temperature rule set finds correlation with a threshold, one or more of the rules has been met or violated, or some other threshold or trigger condition has been determined for a given powered component, then application of mobility features according to the present application is triggered. In some embodiments, a second set of mobility rules governs movement of one or more applications or computer application environments between servers 254, hard drives 255 or other powered components 255. In the present example, FIG. 3B illustrates resolving a thermal discord defined by the co-existence of the hot spot 256 and the cold spot 260 within the room 250. As it is desired to eliminate the determined hot spot 256, and thermal monitoring in the room has identified a cold spot 260 relative to the rest of the room 250, and idle server 254n and/or idle hard drive(s) 255n is most proximate to the cold spot 260 and is compatible with server 254i and/or hard drive 255i, the mobility rules select server 254n for receipt of one or more applications running on server 254i, or one or both hard drives 255n for performing a memory access or other process presently utilizing one or both of hard drives 255i.

Thus, in one rule, application server 254n may be powered on and all applications running on server 254i, possibly including an entire server system environment, is/are moved to server 254n. Server 254i may then be powered off in order to reduce 276 the temperature in the hot spot 256 by reducing its heat contribution. Moreover, as server 254n is most proximate to the cold spot 260 the rule may prefer server 254n over others of the servers 254, for example by determining a cold-spot proximity ranking or value for each server 254 as a function of proximity distance, and selecting a server 254 for relocation as a function of the proximity value, an amount of said value indicating an ability to accommodate the heat generated by performing the moved processes without causing another hot spot generation proximate thereto relative to other servers 254/components 255 in the room 250. Accordingly, the cold spot 260 is also at least partially abated or changed 278 through receiving radiate or generated heat from the server 254n and/or associated component 255n receiving the moved process.

A wide variety of server 254 or component 255 parameters may also be considered in making mobility determinations. In one embodiment, a predefined timing function is activated with an application movement at 110 such that no further mobility actions may occur until after a time period has elapsed believed sufficient to affect thermal changes, and further after which new temperature measurements are performed to verify successful abatement of the hot spot 256, and wherein after this interval the trigger and mobility action logic would once again become active, for example by turning on servers 254c and/or 254h and also moving applications from 254e to one or both of servers 254c and 254h and shutting down server 254e, in order to further reduce radiant or operative heat contributed to hot spot 256 by server 254e.

Operating status may also be considered in selecting servers 254 or components 255 for receiving moved processes. Thus, an idle server 254 or component 255 may be preferred over another already operating. The relative equipment heat dissipation capabilities or capacities, or sensitivity to heat relative to performance, of each of the servers 254 or components 255, may be considered. The location characteristics within the room 250 may be considered, for example relative proximity to an HVAC systems or component air conditioning, exhaust fan or vent duct or grill 272 indicating an enhanced process availability. Proximity to other operating, thus heat-generating, servers 254 or components 255 may be considered: thus server 254f located between operating servers 254e and 254g may be less preferred than a top-of-edge-rack server 254a, or another end rack server 254l. Still other parameters will be apparent to one skilled in the art.

Application of a second set of mobility rules may thus result in a number of actions. Thus a single server 254i-to-254n mobility action illustrated in FIG. 3B may be sufficient to resolve a determined thermal discord. In other examples combinations of application and partition mobility actions may be performed to resolve a thermal discord, for example: a single application mobility action combined with single partition mobility action; multiple application mobility actions; multiple application mobility actions combined with a single partition mobility action; multiple partition mobility actions; and multiple application mobility actions combined with multiple partition mobility actions. Moreover, any of the above examples may be initially initiated pursuant to a rule set application, and one or more may be selected subsequently in response to determining through looping through the monitoring and selecting and implementing steps 102 through 110 illustrated in FIG. 1 that a given hot spot 256 is not being successfully abated by a previous mobility action(s).

Figure 4:
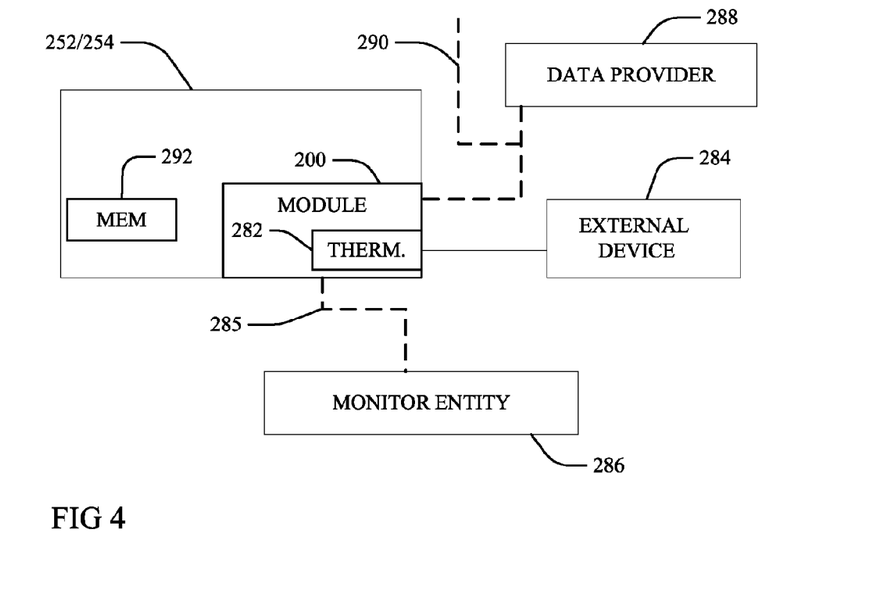
FIG. 4 is a block diagram of an implementation of a system or device configured to monitor temperatures and provide process mobility according to the present application.

Measurement and monitoring of room or server temperature characteristics may be accomplished by components incorporated within or associated with a server 254 or rack 252, or by an external means such as the device 200 (FIG. 2) or other computer or programmable appliance in communication with a server 254 or rack 252. FIG. 4 illustrates one embodiment wherein the module 200 is configured to directly measure temperatures through a thermometer means 282, and/or to receive inputs from another external temperature sensing device 284 (which may comprise another module 200) to thereby monitor and report observed temperatures, in some examples reporting at regular or defined intervals to a third party 286 such as a central bureau through a communication means 285.

In some embodiments, the device 200 or the monitor/central bureau 286 may apply a local table of acceptable temperature values, for example one stored in the module memory 203 or within a memory means 292 incorporated within a server 254 and in communication with the module 200 or monitor/central bureau 286. In some embodiments, a device 200 may also communicate directly through a connection means 290 with other devices/systems 288, including service providers, governmental or regulatory entities, in one aspect to update or acquire current and/or projected temperature specifications and/or rule sets for the room 250, racks 252 or servers 254 or components 255, thereby dynamically revising application mobility operations and systems.

Comparing actual observed temperature usages and selecting mobility options in response to one or more specifications may comprise using one or more look-up tables for a given servers 254 or component 255. Look-up table entries may include variables specific to a server 254 and to an operating context: thus monitoring a server 254 or component 255 or room 250 area or region for temperature may also comprise monitoring or observing the operating context of a server 254 or component 255, wherein an observed temperature may be compared to a corresponding look-up table entry for an expected temperature for the server 254 or component 255 for the operating context, for example as expected for a network processing system server 254 "comprising a number of X processors operating at Y GHz, with Z internal disk drives of specified size XX and a YY RPM performance attribute."

II. Computerized Implementation

Figure 5:
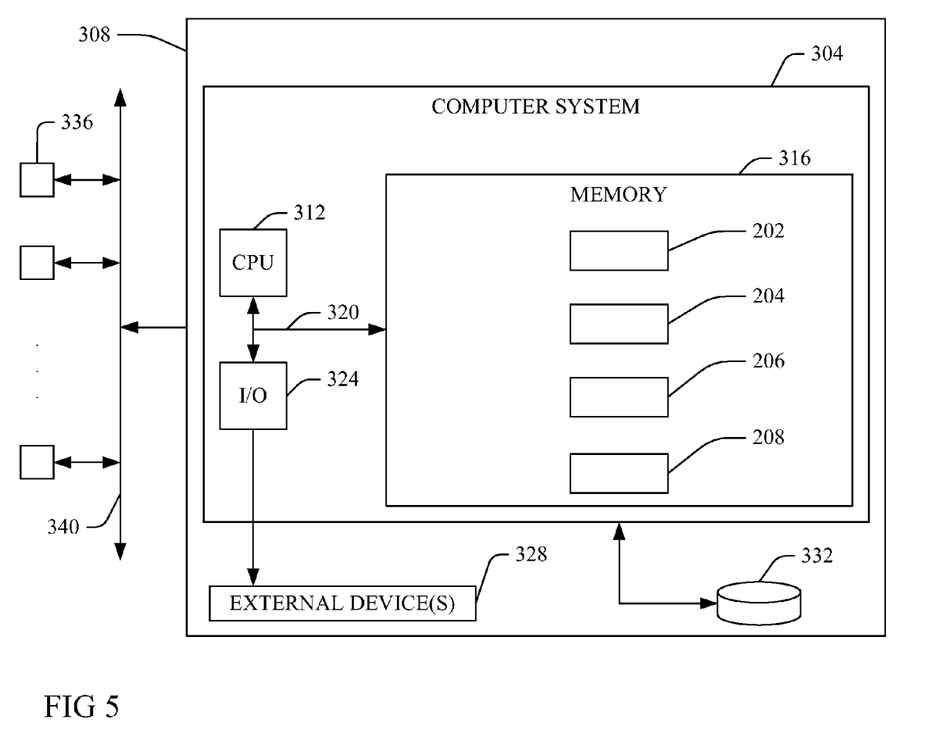
FIG. 5 is a block diagram illustrating a computerized device implementation of a method and system for moving computing processes without loss of service according to the present application.

Referring now to FIG. 5, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/o) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-4 and described above, including the monitor logic component 202, the thermal rule set logic component 204, the mobility rule set logic component 206 and the process-mover logic component 208 discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 5 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for moving computing processes without loss of service, comprising:

monitoring via a processing unit thermal characteristics for each of a plurality of servers deployed in a computing infrastructure, wherein each of a plurality of the thermal characteristics are associated with one each of the deployed plurality of servers;

comparing the monitored thermal characteristics to a temperature threshold;

moving a computing application executing on the first server to a different second server of the plurality of servers in real-time and without causing an interruption of service to an end user using the moved computing application, wherein the moving is a function of applying a mobility rule set comprising a predefined timing function and is in response to an association of the first server with a first of the monitored thermal characteristics that exceeds the compared temperature threshold, and also in response to an association of the second server with a second of the monitored thermal characteristics that does not exceed the compared temperature threshold;

preventing the processing unit from moving an additional computing application running on the first server to another of the servers until after a specified time period has elapsed, wherein the specified time period is sufficient to effect thermal changes in the first server in response to the moving of the first executing computing application;

taking a new temperature measurement of the first monitored thermal characteristic subsequent to the elapse of the specified time period; and verifying that the new temperature measurement of the first thermal characteristic no longer exceeds the temperature threshold; or if the new temperature measurement of the first thermal characteristic exceeds the temperature threshold, moving one each of at least one additional computing application executing on the first server to another different server of the plurality of servers after each respective elapse of the specified time period, until a new temperature measurement of the first thermal characteristic does not exceed the temperature threshold; and wherein the moved computing applications are logical partition server environments appearing to the end user as individual physical servers, and wherein the logical partition server environments each comprise a computing operating system and a plurality of running applications.

2. The method of claim 1, further comprising:

selecting the second server in response to determining that the second server is not currently powered on and is in a location distal-most relative to other operating ones of the plurality of servers.

3. The method of claim 1, further comprising:

selecting the second server over another of the different servers that is available for running the moved computing application in response to determining that the second server is more proximate to an air conditioning duct than the another available server.

4. The method of claim 1, further comprising:

selecting the second server over another of the different servers that is available for running the moved computing application in response to determining that performance of the second server is less sensitive to heat relative to a performance of the another available server.

5. The method of claim 1, further comprising:

selecting the second server over another of the different servers that is available for running the moved computing application in response to determining that the another available server is located more proximate than the second server to other operating, heat-generating servers of the plurality of servers.

6. A method for providing a service for moving computing processes without loss of service, the method comprising:

providing a processing unit in communication with a computer readable memory and a tangible computer-readable storage device, wherein the processing unit, when executing program instructions stored on the tangible computer-readable storage device via the computer readable memory:

monitors thermal characteristics for each of a plurality of servers deployed in a computing infrastructure, wherein each of a plurality of the thermal characteristics are associated with one each of the deployed plurality of servers;

compares the monitored thermal characteristics to a temperature threshold;

moves a computing application executing on the first server to a different second server of the plurality of servers in real-time and without causing an interruption of service to an end user using the moved computing application, wherein the moving is a function of applying a mobility rule set comprising a predefined timing function and is in response to an association of the first server with a first of the monitored thermal characteristics that exceeds the compared temperature threshold, and also in response to an association of the second server with a second of the monitored thermal characteristics that does not exceed the compared temperature threshold;

prevents movement of an additional computing application running on the first server to another of the servers until after a specified time period has elapsed, wherein the specified time period is sufficient to effect thermal changes in the first server in response to the moving of the first executing computing application;

takes a new temperature measurement of the first monitored thermal characteristic subsequent to the elapse of the specified time period; and verifies that the new temperature measurement of the first thermal characteristic no longer exceeds the temperature threshold; or if the new temperature measurement of the first thermal characteristic exceeds the temperature threshold, moves one each of at least one additional computing application executing on the first server to another different server of the plurality of servers after each respective elapse of the specified time period, until a new temperature measurement of the first thermal characteristic does not exceed the temperature threshold; and wherein the moved computing applications are logical partition server environments appearing to the end user as individual physical servers, and wherein the logical partition server environments each comprise a computing operating system and a plurality of running applications.

7. The method of claim 6, wherein the processing unit, when executing the program instructions stored on the computer-readable storage medium via the computer readable memory, further selects the second server in response to determining that the second server is not currently powered on and is in a location distal-most relative to other operating ones of the plurality of servers.

8. The method of claim 6, wherein the processing unit, when executing the program instructions stored on the computer-readable storage medium via the computer readable memory, further selects the second server over another of the different servers that is available for running the moved computing application in response to determining that the second server is more proximate to an air conditioning duct than the another available server.

9. The method of claim 6, wherein the processing unit, when executing the program instructions stored on the computer-readable storage medium via the computer readable memory, further selects the second server over another of the different servers that is available for running the moved computing application in response to determining that performance of the second server is less sensitive to heat relative to a performance of the another available server.

10. The method of claim 6, wherein the processing unit, when executing the program instructions stored on the computer-readable storage medium via the computer readable memory, further selects the second server over another of the different servers that is available for running the moved computing application in response to determining that the another available server is located more proximate than the second server to other operating, heat-generating servers of the plurality of servers.

11. A system, comprising:

a processing unit in communication with a computer readable memory and a tangible computer-readable storage device;

wherein the processing unit, when executing program instructions stored on the tangible computer-readable storage device via the computer readable memory:

monitors thermal characteristics for each of a plurality of servers deployed in a computing infrastructure, wherein each of a plurality of the thermal characteristics are associated with one each of the deployed plurality of servers;

compares the monitored thermal characteristics to a temperature threshold;

moves a computing application executing on the first server to a different second server of the plurality of servers in real-time and without causing an interruption of service to an end user using the moved computing application, wherein the moving is a function of applying a mobility rule set comprising a predefined timing function and is in response to an association of the first server with a first of the monitored thermal characteristics that exceeds the compared temperature threshold, and also in response to an association of the second server with a second of the monitored thermal characteristics that does not exceed the compared temperature threshold;

prevents movement of an additional computing application running on the first server to another of the servers until after a specified time period has elapsed, wherein the specified time period is sufficient to effect thermal changes in the first server in response to the moving of the first executing computing application;

takes a new temperature measurement of the first monitored thermal characteristic subsequent to the elapse of the specified time period; and verifies that the new temperature measurement of the first thermal characteristic no longer exceeds the temperature threshold; or if the new temperature measurement of the first thermal characteristic exceeds the temperature threshold, moves one each of at least one additional computing application executing on the first server to another different server of the plurality of servers after each respective elapse of the specified time period, until a new temperature measurement of the first thermal characteristic does not exceed the temperature threshold; and wherein the moved computing applications are logical partition server environments appearing to the end user as individual physical servers, and wherein the logical partition server environments each comprise a computing operating system and a plurality of running applications.

12. The system of claim 11, wherein the processing unit, when executing the program instructions stored on the computer-readable storage medium via the computer readable memory, further selects the second server in response to determining that the second server is not currently powered on and is in a location distal-most relative to other operating ones of the plurality of servers.

13. The system of claim 11, wherein the processing unit, when executing the program instructions stored on the computer-readable storage medium via the computer readable memory, further selects the second server over another of the different servers that is available for running the moved computing application in response to determining that the second server is more proximate to an air conditioning duct than the another available server.

14. The system of claim 11, wherein the processing unit, when executing the program instructions stored on the computer-readable storage medium via the computer readable memory, further selects the second server over another of the different servers that is available for running the moved computing application in response to determining that performance of the second server is less sensitive to heat relative to a performance of the another available server.

15. The system of claim 11, wherein the processing unit, when executing the program instructions stored on the computer-readable storage medium via the computer readable memory, further selects the second server over another of the different servers that is available for running the moved computing application in response to determining that the another available server is located more proximate than the second server to other operating, heat-generating servers of the plurality of servers.

16. An article of manufacture, comprising:

a computer readable tangible storage device having computer readable program code embodied therewith, the computer readable program code comprising instructions that, when executed by a computer processing unit, cause the computer processing unit to:

monitor thermal characteristics for each of a plurality of servers deployed in a computing infrastructure, wherein each of a plurality of the thermal characteristics are associated with one each of the deployed plurality of servers;

compare the monitored thermal characteristics to a temperature threshold;

move a computing application executing on the first server to a different second server of the plurality of servers in real-time and without causing an interruption of service to an end user using the moved computing application, wherein the moving is a function of applying a mobility rule set comprising a predefined timing function and is in response to an association of the first server with a first of the monitored thermal characteristics that exceeds the compared temperature threshold, and also in response to an association of the second server with a second of the monitored thermal characteristics that does not exceed the compared temperature threshold;

prevent movement of an additional computing application running on the first server to another of the servers until after a specified time period has elapsed, wherein the specified time period is sufficient to effect thermal changes in the first server in response to the moving of the first executing computing application;

take a new temperature measurement of the first monitored thermal characteristic subsequent to the elapse of the specified time period; and verify that the new temperature measurement of the first thermal characteristic no longer exceeds the temperature threshold; or if the new temperature measurement of the first thermal characteristic exceeds the temperature threshold, move one each of at least one additional computing application executing on the first server to another different server of the plurality of servers after each respective elapse of the specified time period, until a new temperature measurement of the first thermal characteristic does not exceed the temperature threshold; and wherein the moved computing applications are logical partition server environments appearing to the end user as individual physical servers, and wherein the logical partition server environments each comprise a computing operating system and a plurality of running applications.

17. The article of manufacture of claim 16, wherein the computer readable program code instructions, when executed by the computer processing unit, further cause the computer processing unit to select the second server in response to determining that the second server is not currently powered on and is in a location distal-most relative to other operating ones of the plurality of servers.

18. The article of manufacture of claim 16, wherein the computer readable program code instructions, when executed by the computer processing unit, further cause the computer processing unit to select the second server over another of the different servers that is available for running the moved computing application in response to determining that the second server is more proximate to an air conditioning duct than the another available server.

19. The article of manufacture of claim 16, wherein the computer readable program code instructions, when executed by the computer processing unit, further cause the computer processing unit to select the second server over another of the different servers that is available for running the moved computing application in response to determining that performance of the second server is less sensitive to heat relative to a performance of the another available server.

20. The article of manufacture of claim 16, wherein the computer readable program code instructions, when executed by the computer processing unit, further cause the computer processing unit to select the second server over another of the different servers that is available for running the moved computing application in response to determining that the another available server is located more proximate than the second server to other operating, heat-generating servers of the plurality of servers.

* * * * *